March 13, 1962 R. G. WINN 3,025,211
MACHINE FOR APPLYING TAX STAMPS
Filed June 12, 1959 2 Sheets-Sheet 1
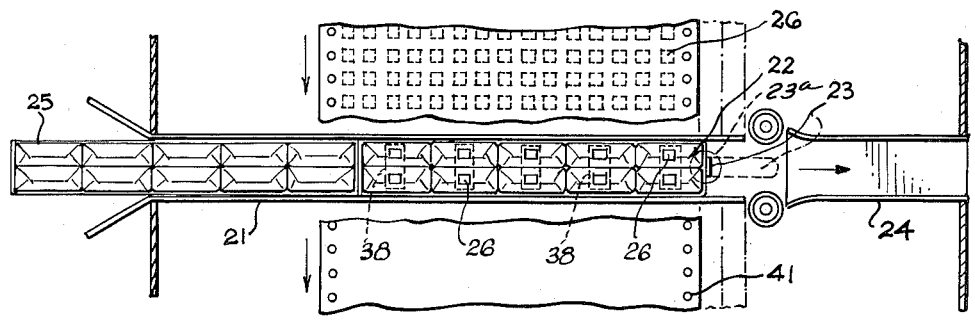
Fig. 1
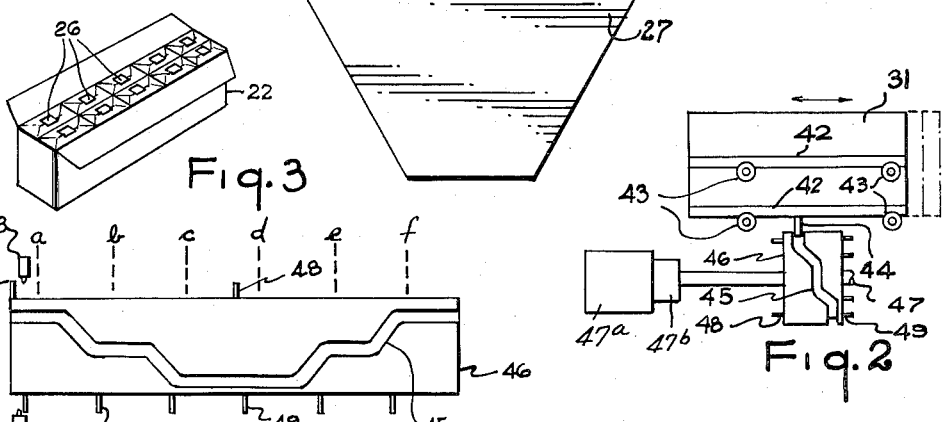
Fig. 3
Fig. 2
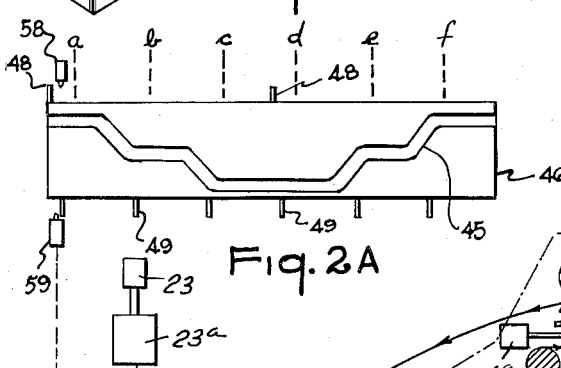
Fig. 2A
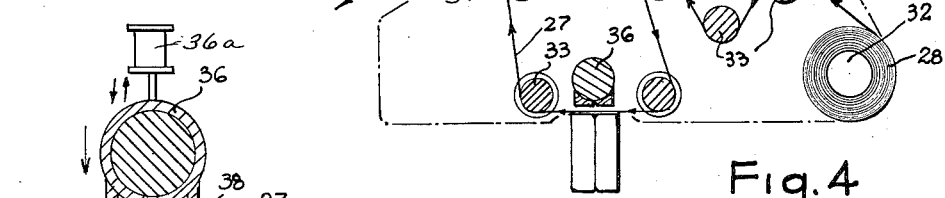
Fig. 4
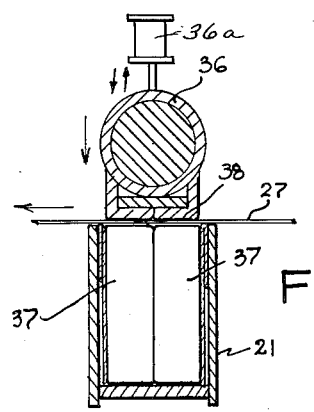
Fig. 5
INVENTOR.
ROBERT G. WINN
BY
Ooms, McDougall, Williams & Hersh
ATTORNEYS March 13, 1962 R. G. WINN 3,025,211
MACHINE FOR APPLYING TAX STAMPS
Filed June 12, 1959 2 Sheets-Sheet 2

INVENTOR.
ROBERT G. WINN
BY Ooms, McDougall,
Williams & Hersh
ATTORNEYS

United States Patent Office 3,025,211
Patented Mar. 13, 1962

3,025,211
MACHINE FOR APPLYING TAX STAMPS
Robert G. Winn, St. Cloud, Fla., assignor to American Decalcomania Company, Inc., Chicago, Ill., a corporation of Illinois
Filed June 12, 1959, Ser. No. 820,037
5 Claims. (Cl. 156—542)

This invention relates to apparatus for automatically applying transfers, such as decalcomania tax stamps, from an elongated sheet or strip to a plurality of objects disposed in a predetermined position, as in a carton. An important specific application of the present invention is the rapid and automatic application of revenue stamps to cigarette packages which, packed in cartons of ten, may be successively fed into processing position in the machine of the present invention.

Revenue stamps, indicating payment of state tax or the like, are customarily applied to cigarette packages in the form of decalcomanias which may be removed from a backing sheet by moistening or by a heat application and thence applied to the cigarette packages. In the past, this operation has sometmise been performed by hand and has involved very substantial labor cost.

For economy in manufacture, the decalcomanias used as revenue stamps are normally made and shipped on an elongated backing sheet of sufficient width to accommodate fifteen stamps, the sheet being of sufficient length to form a long stock roll. The decalcomania stamps are arranged on the stock roll in columns running parallel to the longitudinal dimension of the sheet, there being, as above noted, fifteen columns uniformly spaced across the width of the sheet. While the decalcomanias may in some instances be of the water-transfer type, they are more commonly of the type wherein transfer is achieved by application of heat.

In recent years, automatic or semi-automatic machines for removing decalcomania revenue stamps from such a stock roll onto cigarette packages have been available in the art. To the best of my knowledge, however, all the prior-art machines intended for that purpose have had substantial disadvantages, perhaps the greatest of which is that they have not uniformly applied the stamps to a particular pre-selected position on the cigarette packages. In other words, the prior-art machines of which I have knowledge have applied the revenue stamps to the cigarette packages in an irregular fashion, the stamps being applied to some packages of cigarettes approximately midway of the package top and to other cigarette packages at positions near one end or the other of the package top.

The major object of the present invention is to provide an automatic machine for transferring revenue stamps and the like from a stock roll onto a multiplicity of pre-packaged objects, such as cigarette packages, in such a manner that a decalcomania transfer is applied to the same relative area on each of the pre-packaged objects.

A further object of the invention is to provide a machine of the type above described in which the stock roll is arranged with a greater number of transfers disposed across the width of the roll than are applied simultaneously to any given pre-packaged group of objects, the number of columns of transfers disposed across the width of the stock roll being an integral multiple of the number of transfers applied at any given operation from such stock roll to an assembled row of such pre-packaged objects.

A still further object of the invention is to provide an automatic machine of the class described wherein the objects to be stamped are fed consecutively into a processing position and the stock roll containing transfer stamps is advanced with respect to the processing position in accordance with a pattern of movement involving both lateral and longitudinal incremental steps.

A still further object of the invention involves providing a machine of the type described in the preceding paragraph, wherein the path of movement of the stock roll past the processing position comprises a plurality of lateral incremental steps unaccompanied by longitudinal movement, followed by a single longitudinal step, followed by still further lateral incremental steps, whereby all of the stamps in a given row or predetermined number of rows on the stock roll are transferred following any given longitudinal incremental step of the stock roll and prior to the next such longitudinal incremental step.

Other objects and advantages of the invention will appear from the following description of a typical embodiment thereof.

In the appended drawing, FIG. 1 illustrates diagrammatically, partly in section, a plan view of a machine embodying my invention, the embodiment selected for illustration being a machine adapted for applying revenue stamps to cigarette packages that are packed ten packages to a carton. As shown in FIG. 1, the cigarette packages are fed through a trough or chute, one carton at a time, to a predetermined processing position, while the revenue stamps are mounted on a stock roll which crosses such processing position, the stamps being mounted on the stock roll in fifteen columns distributed uniformly across the width of the roll.

FIG. 2 is a diagrammatic showing of the stock-roll carriage which forms an important part of my invention, in conjunction with a cam-and-follower mechanism which brings about controlled lateral movement of the carriage and coordinates the carriage movement with operation of the transfer head, the stock-sheet advancing mechanism, and other moving parts of the machine.

FIG. 2A is a developed view of the cam shown in FIG. 2, bringing out in detail the shape of the cam track thereon and showing the relative positions of the switch-actuating pins used to coordinate other parts of the apparatus with the carriage-shifting mechanism.

FIG. 3 is a perspective view of a typical carton of cigarettes as it appears after revenue stamps have been applied to the packages therein by means of the automatic machine which is the subject matter of the present specification.

FIG. 4 is a diagrammatic sectional view through the laterally movable stock-roll carriage.

FIG. 5 is a fragmentary sectional view showing the relative positions of the transfer head, the stamp-bearing sheet forming part of the stock roll, and a typical carton of cigarettes as they appear at the processing position during a typical stamp-transferring operation.

Figure 6:
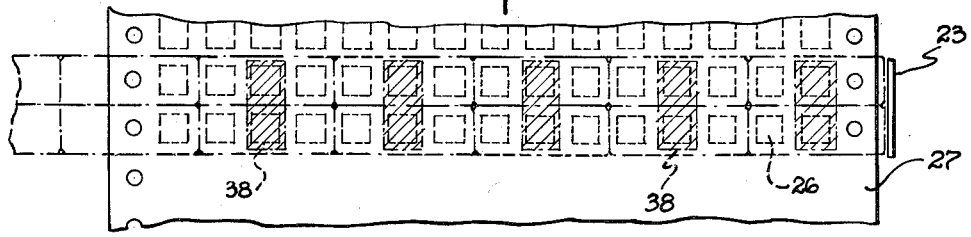
Figure 7:
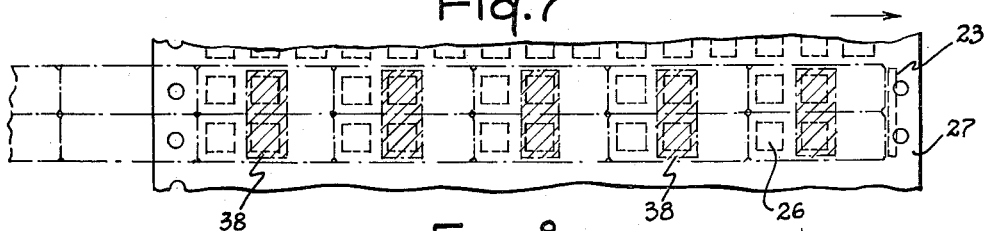
Figure 8:
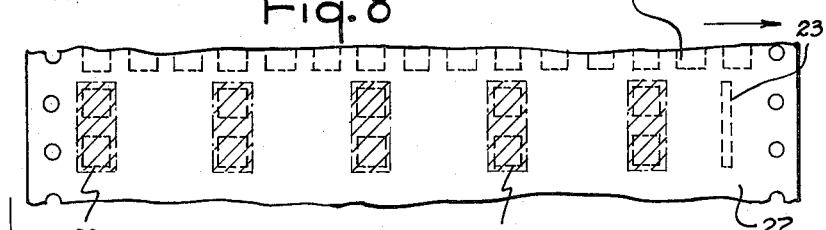
Figure 9:
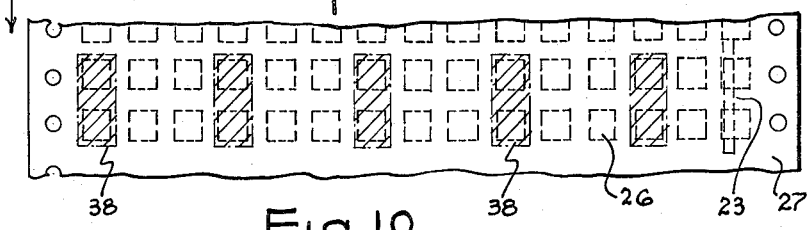
Figure 10:
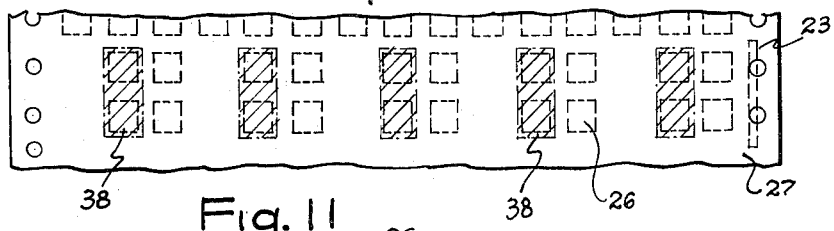
Figure 11:
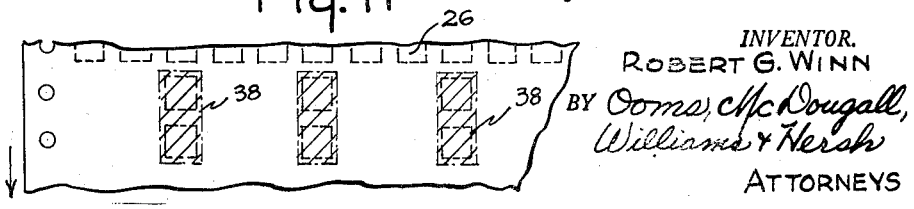

FIGS. 6–11 are diagrammatic views showing successive steps in the lateral and longitudinal movement of the transfer-carrying stock sheet, relative to the processing position occupied by the successive cigarette cartons during the transferring operation. FIG. 6 shows the relative positions of the carton being processed, the stock sheet, and the heated transfer heads at the time the stamps in a given pair of rows on the stock sheet are being first operated upon. FIG. 7 shows the appearance and relative positions of the transfer heads and the stock sheet when the next carton of cigarettes has been advanced into the processing position. FIG. 8 shows the operation of my machine at the next later stage, wherein the stock sheet (and the carriage which supports and guides it) have moved an additional step laterally, bringing under the heated transfer heads the third set of transfer stamps in the two rows under consideration, thus permitting their transfer to still another carton of cigarettes. FIGS. 9–11 show successive steps in the removal of the stamps from the next two transverse rows of revenue stamps on the stock sheet.

Referring now to FIG. 1, I have illustrated diagrammatically thereon a means for feeding cigarette cartons, with their top flaps folded back, into a processing position at which revenue stamps can be simultaneously applied by heat transfer onto each of the ten packages in the carton. This apparatus for thus guiding and advancing the cigarette cartons is per se conventional and need not be described in detail. It includes a suitable chute or guideway 21, into which successive cartons such as carton 22 are fed under the urging of any suitable outside impelling means (not shown). Chute 21 is sufficiently narrow as to force the cartons to pass through it in single file. The processing position is defined by a retractable stop element 23 disposed within the chute 21 near its exit end. By conventional means well known to the art, the stop member 23 is lowered after stamps have been applied to a particular carton, thus affording clearance for the single file of cartons to advance. When the carton which has just been stamped, being the one marked 22 in FIG. 1, has passed sufficiently far beyond the processing position to drop over onto the downwardly inclined exit chute 24, the stop member 23 rises, tumbling the carton 22 into the exit chute and intercepting and holding the next carton of cigarettes in the processing position. As the operation of the machine progresses, this action is successively repeated. Stop member 23 may be intermittently actuated by a conventional solenoid 23a or valve-controlled pneumatic actuator. Its operations are, in the illustrated embodiment, controlled by conventional switches, such as Micro switches, that are intermittently actuated by pins on the cam mechanism presently to be described.

If completely automatic feeding of the cartons is desired, any suitable automatic means may be provided for pushing the cartons forward in the chute 21, such techniques being well known to the art. Alternatively, the force necessary to advance the cartons in the chute 21 may be provided manually.

FIG. 3 shows in perspective view the appearance of a cigarette carton after the packages therein have been provided with revenue stamps by means of my machine. When such carton has passed the processing position, it and its successors are collected at any suitable place downstream of the exit chute 24, where the top flaps on the cartons are closed and sealed, to prepare them for shipment and sale.

The cigarette packages in any given carton processed by my machine all receive the revenue stamp at the same relative position, normally centrally of the package top as indicated by 26 on FIG. 3. If application of the stamps to some different part of the package tops is desired, this can be achieved simply by appropriate adjustment of the position of the chute 21 and stop member 23 with respect to the stock-roll carriage presently to be described. As previously noted, this uniformity of position at which the stamps are applied to the individual packages is an important feature of my invention.

The revenue stamps applied by means of my machine are manufactured and sold on elongated stock sheets such as sheet 27, such sheets being many feet in length and being normally packaged and sold in the form of sizable rolls, as indicated by the reference numeral 28 in FIG. 4.

Throughout this specification, it will be understood that references to "stock sheet" or to "stock roll" refer to such an elongated sheet of transfer-carrying paper or other supporting material.

As already noted, an important part of my machine consists in a movable, roller-carrying carriage 31, which comprises, on a suitable frame, a roller 32 for supporting the stock roll 28, various idler rollers 33 for guiding the end portion of the stock sheet from the roll 28 past the processing position and thence to the drive-sprocket roll 34 and its mating platen roller 35. From platen roller 35 the end portion of the stock roll is fed to any suitable waste-disposal means, which may be a take-up roller, a waste basket, or the like.

Also forming an important part of my machine is a vertically retractable heated transfer head 36 comprising an elongated transverse body portion, indicated in section on FIG. 5, that extends across the width of the stock sheet directly over the chute 21. Head 36 is mounted in any suitable manner (not shown) for retractable movement in a vertical direction or in an arc such that, on being advanced, it will bear against the upper side of the stock sheet and press it against the cigarette packages, such as those marked 37 in FIG. 5, which are disposed below the stock sheet in the chute 21. On the underside of the head 36, at a plurality of spaced positions, are a group of contact or transfer elements 38, shaped and adapted to transfer pressure and heat effectively onto the upper surface of the stock sheet 27 and thence onto the cigarette packages therebeneath. The transfers are disposed on the lower side of the stock sheet, and are caused, by the heat and pressure supplied by transfer elements 38, to leave the stock sheet and attach themselves to the outer surface of the cigarette packages.

The transfer elements 38 may be heated by a suitable electric heating element disposed in the transverse, elongated portion of the transfer head 36, or by any other suitable means. Such heating elements are conventional in the art and need not be described in detail. Conventional thermostat means may be provided for maintaining the temperature of the transfer elements 38 at the optimum value for effective transfer of the tax stamps. Again, such structure per se is well known in the art and does not of itself form a part of the present invention.

As may be seen from FIG. 1 and FIGS. 6–11, the revenue stamps 26 or other transfers to be applied by my machine are disposed on the stock sheet 27 in columns and rows, each column running substantially the entire length of the sheet and the rows being uniformly distributed across the width thereof. For most efficient utilization of the automatic features of my machine, the number of columns on the stock sheet should be an integral multiple of the number of stamps to be applied from any given row in a single operation. Thus, when the objects to be stamped are cigarette packages arranged in cartons in two tiers of five packages each, then the number of columns of stamps on the sheet should be fifteen, i.e., three times five. This is the disposition of stamps shown in stock sheet 27 as illustrated in FIG. 1 and FIGS. 6–11. In the following discussion of the operation of my machine, it will of course be understood by skilled readers that the structural details of the machine may be changed to accommodate stock sheets having a different number of columns or stamps than fifteen, that number being merely illustrative.

It will be understood that successive deposition on objects of stamps from the stock sheet 27 requires intermittent advance of the sheet in predetermined increments, so that, after all the stamps in a given row or group of rows have been removed, the sheet can be advanced sufficiently to bring a new set of stamps into transfer position. To facilitate this intermittent advance of the stock sheet in predetermined increments, the sheet may be provided along its side edges with sprocket holes 41, which are successively engaged by the sprocket wheel 34 for advancement of the sheet in increments of the proper size. This, it will be understood, is merely one suitable means of providing controlled advance of the stock sheet during a series of stamping operations, and any other suitable means to that end may be used.

The carriage 31 is mounted over the processing position defined by chute 21 and stop member 23 in a manner permitting its lateral movement within a limited range. One suitable arrangement for this purpose consists of transverse ways or slide members 42 on the back of the carriage, which cooperate with rollers 43 carried on fixed shafts. This sort of arrangement permits the carriage 31 to move laterally with respect to the transfer head 36 and the chute 21, much as a typewriter carriage may be laterally moved relative to the frame and type bars of a typewriter.

Controlled lateral movement of the carriage 31 for effecting the purposes of my invention may be accomplished in any desired manner, there being many mechanical equivalents known to the art for achieving such movement. In the illustrated embodiment, I have shown, as a means of achieving such controlled lateral movement, an arrangement in which the carriage 31 is provided on its under side or other suitable location with a cam follower in the form of a pin 44 rigidly mounted on the carriage. Pin 44 rides in a cam track 45 which is cut in the curved surface of a cylindrical cam member 46, cam 46 being generally wheel shaped and being rotatably mounted on a shaft 47.

FIG. 2A provides a developed view of the cam track 45. On opposite sides of the cam wheel 46, or on the same side in differing radial positions, I provide switch-actuating pins 48 and 49 respectively. There are two pins 48 provided in the illustrated embodiment, disposed diametrically opposite each other on the cam wheel 46 at the positions brought out clearly in FIG. 2A, and there are six of the pins 49, two of which have angular positions slightly lagging the pins 48 and the others of which are disposed symmetrically around the periphery of the cam wheel 46 so that all the pins 49 are substantially 60° apart.

A micro switch 58 or other suitable pressure-actuated switch is provided for the pins 48 and another such switch 59 is provided for the pins 49, each switch being momentarily actuated by engagement with the respective pins as the pins successively pass the switches during rotation of the cam wheel 46.

The switch 58 actuated by the pins 48 is employed in conventional fashion 34a to cause an incremental rotational movement of the sprocket wheel 34 to effect advancement of the stock sheet 27. In the illustrated embodiment of the invention, each incremental advance of the stock sheet 27 will move the stock sheet forward a distance corresponding to two rows of stamps on the sheet.

The switch 59 operated by the pins 49 is employed in a manner conventional in the art to actuate the transfer head 36, causing it to be moved downward from the retracted position shown in FIG. 4 to the advanced position shown in FIG. 5. Each advance movement of the transfer head 36 lasts long enough to effect transfer of the stamps 26 that underlie the contact elements 38 from the stock sheet 27 onto the cigarette packages which at the moment occupy the processing position within chute 21. When the transfer has thus been effected, the head 36 returns to its retracted position and remains there until the next time one of the pins 49 engages its associated Micro switch 59.

It will of course be understood that the stock sheet is disposed on the carriage 31 in such a manner as to bring the transfers 26 over the processing position on the under side of the sheet 27, so that application of pressure and heat on the upper side of the sheet from contact elements 38 will cause the transfers 26 to leave the sheet 27 and deposit themselves on the juxtaposed cigarette packages 37, as indicated in FIG. 5.

The electromechanical mechanisms for advancing and retracting the transfer head 36 and actuating the sprocket roller 34 are conventional in the automatic-machine art, just as is suitable mechanism for momentarily depressing the stop member 23 after each stamping operation, and hence will not be described in detail in this specification.

Since each stamping operation is followed by a momentary retraction of the stop member 23, the mechanism controlling that element may also be associated with the switch 59 controlled by the pins 49, so that each operation of the transfer head 36 is followed by a retractile movement of the stop member 23. Since stop member 23 should retract a few moments after completion of the stamping operation, however, a suitable time delay should be introduced into the apparatus for this purpose. This can be done either by means of a mechanical time-delay device such as a dash pot, or it may be accomplished by having the stop member 23 controlled by a separate switch actuated by the retractile movement of the transfer head 36, so that the stop member 23 moves downwardly immediately upon upward movement of the transfer head 36. These features of the apparatus, again, are per se conventional.

The sequence of lateral movements of the carriage 31 and hence of the stock sheet 27 may be readily understood by study of FIGS. 2 and 2A in connection with FIGS. 6-11. The cam wheel 46 is rotated periodically in increments of 60°. This may be accomplished by any suitable mechanical arrangement for the purpose, such as a Geneva-gear mechanism 47a suitably coupled by a gear train 47b to the shaft 47 so as to produce a 60° rotation of shaft 47 for each 90° rotation of the Geneva gear. (Since this part of the machine is also per se conventional, it will be understood that any suitable mechanical equivalent may be used instead of the Geneva-gear arrangement.)

Assume at the outset that the wheel 46 has just assumed the position whereat the pin 48 at the left side of FIG. 2A has engaged its associated Micro switch and has caused the sheet 27 to advance. Under these conditions, the carriage 31 will occupy its full left position, and the sheet 27 will be positioned relative to the chute 21 and stop member 23 as indicated in FIG. 6. In that position, the contact members 38 of transfer head 36 will directly overlie the third, sixth, ninth, twelfth, and fifteenth columns of stamps on sheet 27, counting from left to right as viewed in FIGS. 6-11.

As the pin 49 which immediately trails the pin 48 last above mentioned engages its associated Micro switch, the transfer head 36 will move downward into engagement with the top surface of sheet 27, as diagrammatically illustrated on FIG. 6, and the stamps disposed beneath the contact elements 38 will be transferred by heat and pressure onto the cigarette packages which at that moment are disposed in the chute 21 at the processing position.

When the head 36 returns to its retracted position following the transfer operation, the stop member 23 will retract as previously noted, and a new carton of cigarettes will move into the processing position. Thereupon the cam wheel 46 will turn through a 60° arc, pulling the carriage 31 to its intermediate position as shown in FIG. 7 and at the same time causing the next pin 49 to actuate the Micro switch 59. This will cause the transfer head 36 to again advance against the upper surface of the sheet 27, and the contact members 38 will cause the second, fifth, eighth, eleventh, and fourteenth columns of stamps to be detached from the sheet 27 and deposited on the respective packages in the cigarette carton now occupying the processing position.

This stamping operation is of course again followed by a downward movement of the stop member 23, causing the carton just stamped to be discharged from the chute and bringing a new carton into the processing position.

The next rotational movement of the cam wheel 46 through a 60° arc will shift the carriage 31 to its full right position, as shown in FIG. 8, and the procedure just described will result in deposition on the packages in the newly placed cigarette carton of the stamps in columns 1, 4, 7, 10, and 13.

The next following 60° rotational movement of the cam wheel 46 will cause the second pin 48 to actuate switch 58, thus advancing the stock sheet by two rows of stamps, and the switch 59 will be actuated immediately thereafter by the next pin 49, causing the above-described cycle of operations to repeat and producing deposition on the newly placed cigarette packages of the stamps in columns 1, 4, 7, 10, and 13 from the rows of stamps on sheet 27 that now overlie the processing position. This phase of the operation is shown in FIG. 9.

Continued movement of the cam wheel 46 in successive incremental steps of 60° each will cause the deposition onto succeeding cigarette packages of the remaining stamps in the two rows overlying the processing position, and, after the stamps shown in FIG. 11 have been duly transferred, the cycle of operations will repeat, as the first-mentioned pin 48 again passes switch 58 and advances the stock sheet.

From the foregoing description of the operation of a typical embodiment of my invention, it will be seen that my machine will successively apply revenue stamps or other transfers to cigarette packages or other objects successively fed into the processing position, the stamps being in each instance applied to the same relative portions of each object in turn.

While I have in this specification described in considerable detail a typical embodiment of my invention, as adapted to a particular application, it should be understood that the principles of the invention are not limited to the specific embodiment illustrated. It is my desire that the scope of the invention be determined primarily by reference to the appended claims.

I claim:

1. In a machine for applying transfers simultaneously to a plurality of objects from an elongated pre-fabricated stock sheet carrying said transfers removably adhered to one surface thereof, said transfers being disposed on said sheet in a plurality of columns, the transfers in each column being spaced apart longitudinally of said sheet and said columns being spaced apart across the width thereof, the combination comprising: a fixedly positioned object-restraining means defining a processing position, said means being adapted to guide successively into said processing position a group of said objects, carriage means supporting said stock sheet and comprising means for advancing the same longitudinally in predetermined increments corresponding to the longitudinal spacing between transfers on said sheet, said carriage means being so disposed relative to said processing position that longitudinal advance of said sheet on said sheet on said carriage moves said sheet transversely across said object-restraining means, said carriage being laterally shiftable to any selected one of a plurality of predetermined positions relative to said object-restraining means, a transfer head disposed above said sheet and said object-restraining means and movable between an advanced position and a retracted position, said head being formed to define on its lower side a plurality of contact areas positioned to register with the respective objects disposed in said processing position when said transfer head is advanced, said contact areas being operative in said advanced position to press said sheet against said objects and to apply transfers therefrom to said respective objects, means intermittently operative to shift said carriage laterally from one of said predetermined positions to another to bring various of said columns of transfers on said sheet successively into registration with the respective objects occupying said processing position, means coordinated with said carriage-shifting means for intermittently advancing and retracting said transfer head, means coordinated with said carriage-shifting means for intermittently actuating said sheet-advancing means on said carriage, and means controlling said object-restraining means for successively releasing said objects from said processing position after each advance movement of said transfer head.

2. In a machine for applying transfers automatically to a plurality of objects from an elongated pre-fabricated stock sheet carrying said transfers removably adhered to one surface thereof in a plurality of columns, said transfers being arranged on said sheet in columns extending longitudinally thereof and rows extending thereacross, the improvement which comprises a carriage means supporting said stock sheet in a transfer-applying position, in combination with means for advancing said stock sheet in a longitudinal direction across said carriage in predetermined increments corresponding to the longitudinal spacing between the transfers in said columns and means for shifting said carriage laterally in predetermined increments corresponding to the spacing between transfers in said rows.

3. The improvement defined in claim 2 comprising also means for intermittently actuating said sheet-advancing means in coordinated relation with said carriage-shifting means operative to advance said sheet by one incremental step after a predetermined number of incremental lateral movements of said carriage.

4. In a machine for simultaneously applying a plurality of revenue stamps from a stock sheet to the respective packages in a pre-packed carton of cigarettes comprising ten packages of cigarettes arranged in two adjacent rows of five packages each, said stamps being removably adhered to one surface of said stock sheet and being symmetrically arranged thereon in columns running longitudinally of said sheet, the total number of such columns being an integral multiple of five, the longitudinal separation of adjacent stamps in each column being substantially equal to the mean spacing between the adjacent rows of cigarette packages in such carton, the combination comprising means defining a fixed processing position and adapted to hold cartons successively in such position, carriage means overlying said processing position and adapted to pass said stock sheet over a carton of cigarette packages occupying such processing position, means for advancing said stock sheet on said carriage in predetermined increments of movement bearing a definite relationship to the longitudinal spacing between the transfers in said columns, the direction of movement of said sheet on said carriage being at right angles to the longitudinal dimension of a carton disposed in said processing position, means for shifting said carriage laterally in predetermined increments bearing a definite relationship to the lateral spacing between adjacent columns of transfers on said sheet, a transfer head disposed above said processing position and so positioned relative to said carriage that said sheet is interposed sandwich fashion between said transfer head and a carton of cigarette packages occupying said processing position, said head being formed with contact areas respectively positioned to register with all the indivdiual packages in a carton occupying said processing position and being movable between at least one position wherein said contact areas press said sheet against said packages and at least one other position wherein said areas do not press said sheet against said packages, means for actuating said carriage-shifting means to effect successive and intermittent lateral movements of said carriage in accordance with a predetermined reciprocal and repetitive pattern of movement, means coordinated with said carriage-shifting means for intermittently actuating said sheet-advancing means, and means coordinated with said carriage-shifting means and said sheet-advancing means for moving said transfer head into a pressing position and thence into a non-pressing position following each actuation of either said carriage-shifting means or said sheet-advancing means.

5. The apparatus defined in claim 4 comprising also means operative to discharge a carton of cigarette packages from said processing position after each pressing movement of said transfer head.

References Cited in the file of this patent

UNITED STATES PATENTS

| | | |
|---|---|---|
| Re. 24,516 | Brownlee | Aug. 12, 1958 |
| 2,324,411 | Miller et al. | July 13, 1943 |
| 2,493,523 | Brownlee | Jan. 3, 1950 |
| 2,516,783 | Matter | July 25, 1950 |
| 2,621,434 | Jackson | Dec. 16, 1952 |
| 2,736,448 | Winn | Feb. 28, 1956 |

FOREIGN PATENTS

| | | |
|---|---|---|
| 572,947 | Canada | Mar. 24, 1959 |